(12) United States Patent
Chen

(10) Patent No.: US 11,112,000 B2
(45) Date of Patent: Sep. 7, 2021

(54) LUBRICATING SYSTEM AND PUMPING UNIT WITH LUBRICATING SYSTEM

(71) Applicant: Forland Services LLC, Houston, TX (US)

(72) Inventor: Delin Chen, Houston, TX (US)

(73) Assignee: Forland Services LLC, Houston, TX (US)

( * ) Notice: Subject to any disclaimer, the term of this patent is extended or adjusted under 35 U.S.C. 154(b) by 174 days.

(21) Appl. No.: 16/424,510

(22) Filed: May 29, 2019

(65) Prior Publication Data

US 2020/0158229 A1    May 21, 2020

(30) Foreign Application Priority Data

May 30, 2018 (CN) .............................. 201810540804

(51) Int. Cl.
  *F16H 57/04* (2010.01)
(52) U.S. Cl.
  CPC ..... *F16H 57/0467* (2013.01); *F16H 57/0427* (2013.01)
(58) Field of Classification Search
  CPC ............. F16H 57/0427; F16H 57/0402; F16H 57/0404; F16H 57/05; F04B 39/0284; F04B 47/02
  See application file for complete search history.

(56) References Cited

U.S. PATENT DOCUMENTS

| | | | | |
|---|---|---|---|---|
| 4,062,187 A * | 12/1977 | Hilpert | ..................... | B66D 1/24 60/326 |
| 4,593,923 A * | 6/1986 | Thalmann | ................ | B62J 31/00 15/256.6 |
| 9,410,609 B1 * | 8/2016 | Jongebloed | ............. | F16H 57/05 |
| 2018/0142777 A1 * | 5/2018 | Li | .............................. | F04B 9/02 |

* cited by examiner

*Primary Examiner* — Jake Cook

(74) *Attorney, Agent, or Firm* — Gang Yu

(57) ABSTRACT

Provided are a lubricating system and a pumping unit including the lubricating system. In addition to the lubricating system, the pumping unit further includes a rack, a transmission wheel located in the rack, and a transmission conveying device cooperated with the transmission wheel. The lubricating system includes an oil pool and a roller lubrication device. A bottom of the transmission wheel is impregnated in the oil pool. The roller lubrication device is in rolling contact with the transmission conveying device. An oil return device is disposed above the oil pool and configured to collect splashing oil driven by the transmission conveying device. After the splashing oil is cleaned twice, the splashing oil flows back into the oil pool.

15 Claims, 2 Drawing Sheets

LUBRICATING SYSTEM AND PUMPING UNIT WITH LUBRICATING SYSTEM

TECHNICAL FIELD

The disclosure relates to a reciprocating oil extraction apparatus, and in particular to a lubricating system for a vertical reciprocating pumping unit and a pumping unit with the lubricating system.

BACKGROUND

In recent years, a reciprocating pumping unit has been widely used in oil exploitation. The reciprocating pumping unit drives a pumping rod to reciprocate through a transmission system to raise underground oil to the ground, thereby realizing oil exploitation and production.

In a reciprocating oil extraction apparatus, the pumping unit has a variety of models, but is mainly divided into two categories in mode, namely a beam pumping unit and a vertical pumping unit. The vertical pumping unit has a longer pumping stroke and better balance, and can meet the requirements of large loads.

CN101469606A discloses a chain oil supply system. The chain oil supply system includes an oil storage tank and an oil supply pipeline mounted on a body. The oil supply pipeline is connected to an oil pump. A top of the body is provided with an oil groove. The oil supply pipeline is inserted into the oil groove. An oil outlet hole is provided on the oil groove right above a chain. Oil lubricating a transmission system directly flows back into the oil storage tank.

However, the return oil filter effect of the above lubricating oil passage is not good, and there are impurities in return oil, which affects the lubricating effect.

SUMMARY

Some embodiments of the present disclosure provide a lubricating system and a pumping unit including the lubricating system, achieve the return oil filter function of the whole lubricating system and improve the cleanliness of an oil pool.

To achieve the above objective, an embodiment of the disclosure provides a pumping unit. The pumping unit includes a rack, a balancing device, a transmission wheel, and a transmission conveying device cooperated with the transmission wheel, the lubricating system including: an oil pool and a roller lubrication device, a bottom of the transmission wheel being impregnated in the oil pool, the roller lubrication device being in rolling contact with the transmission conveying device, wherein the lubricating system further includes an oil return device disposed above the oil pool, wherein the oil return device is configured to collect splashing oil driven by the transmission conveying device, so as to clean the splashing oil and then allow the splashing oil to flow back into the oil pool.

In an exemplary embodiment, the oil return device is an oil spill filter device, and the collected splashing oil flows back into the oil pool after exceeding a set liquid level.

In an exemplary embodiment, the oil spill filter device allows the splashing oil to flow back into the oil pool after a first cleaning manner and a second cleaning manner.

In an exemplary embodiment, the first cleaning manner is precipitation manner, and the second cleaning manner is the way of filtration manner.

In an exemplary embodiment, the oil spill filter device includes a first cleaning device and a second cleaning device, the second cleaning device being disposed above the first cleaning device.

In an exemplary embodiment, the first cleaning device is a precipitation box.

In an exemplary embodiment, the second cleaning device is a filter screen.

In an exemplary embodiment, the oil spill filter device further includes a housing, the precipitation box being disposed at a bottom of the housing detachably.

In an exemplary embodiment, the precipitation box includes a box body, a magnet for attracting impurities, and a lifting device disposed at the top of the box body.

In an exemplary embodiment, the second cleaning device is a filter screen, the filter screen being disposed on a side wall section of the housing, the side wall section of the housing being a trumpet structure flared from top to bottom.

In an exemplary embodiment, the housing includes a first section and a second section arranged sequentially from top to bottom, the first section being a section that constricts gradually from top to bottom, the second section being a flared side wall section, and the flared side wall section being of trumpet-shaped. The design of the first section serves to collect the splashing oil. The design of the second section ensures that the splashing oil does not touch the filter screen fixed on the second section of the housing first when the splashing oil falls, which reduces the clogging of the filter screen and ensures the cleanliness of the filter screen.

In an exemplary embodiment, the housing further includes a third section and a fourth section, the fourth section being a section carrying the precipitation box, and the third section being a transition portion of the second section and the fourth section. The design of the third section serves to further guide the splashing oil inside the oil spill filter device, which allows the splashing oil to flow smoothly into the precipitation box.

In an exemplary embodiment, the filter screen is a copper filter screen. The material copper is not easy to rust, thereby further avoiding the clogging of the filter screen, and achieving a good effect of filtering splashing oil.

In an exemplary embodiment, the lubricating system further includes a splash collection system, the splash collection system being disposed on an upstream of an oil passage of the oil spill filter device and configured to guide the splashing oil to the oil spill filter device.

In an exemplary embodiment, the splash collection system includes a guiding device for guiding the splashing oil to the oil spill filter device. The splash collection system guides splashing oil and washed lime from the lubrication process to the oil spill filter device.

In an exemplary embodiment, the guiding device is a guiding plate for a top of the rack and/or a guiding plate for a top of the balancing device.

In an exemplary embodiment, the roller lubrication device includes a plurality of roller lubrication components disposed sequentially. The plurality of roller lubrication components can not only achieve multiple brush lubrication of the transmission conveying device, but also assist in achieving the effect of smooth movement of the transmission conveying device.

An embodiment of the present disclosure provide a pumping unit, the pumping unit includes a rack, a drive system for supplying power to the pumping unit, a control system for controlling the drive system, a speed reducer mounted on the rack, a transmission system fixed on the rack, and a pumping rod hanging load, wherein the pumping unit further includes the above lubricating system.

The beneficial effects of some embodiments of the disclosure are as follows:

1: A lubricating system for a pumping unit is provided, which self-lubricates the entire transmission system through a plurality of sleeve lubrication components, a splash collection system and an oil spill filter device.

2: The oil spill filter device achieves first cleaning through a precipitation box, wherein magnets located inside the precipitation box attract impurities and iron filings in splashing oil, when a level of the splashing oil after the first cleaning is higher than a bottom position of a filter screen, second cleaning is achieved through the filter screen, the splashing oil is cleaned twice and then flows back into an oil pool, and the cleaning effect is good.

3: The arrangement of the plurality of sleeve lubrication components can reliably achieve a full-length reliable lubrication of the transmission conveying device in the pumping unit, and also achieves the effect of smooth movement of the transmission conveying device.

BRIEF DESCRIPTION OF THE DRAWINGS

The accompanying drawings, which constitute a part of the disclosure, are used to provide a further understanding of the disclosure, and the exemplary embodiments of the disclosure and the description thereof are used to explain the disclosure, but do not constitute improper limitations to the disclosure. In the drawings.

The drawings include the following reference signs:

1, oil pool; 2, transmission conveying device; 3, roller lubrication device; 4, guiding plate for a top of the rock; 5: guiding plate for a top of the balancing device; 6, oil spill filter device; 61, housing; 61a, first section; 61b, second section; 61c, third section; 61d, fourth section; 62, precipitation box; 63, filter screen; 64, magnet; 65, lifting device; a, splashing oil return direction; b, oil spill filter level; 7, speed reducer.

DETAILED DESCRIPTION OF THE EMBODIMENTS

It is to be noted that the embodiments of the disclosure and the features of the embodiments may be combined with each other without conflict. The disclosure is described below with reference to the drawings and in conjunction with the embodiments in detail.

The disclosure is further described in detail below with reference to specific embodiments, which are not to be construed as limiting the scope of protection of the disclosure.

A pumping unit in some embodiments of the disclosure includes a rack, a drive system for supplying power to a vertical pumping unit, a control system for controlling the drive system, a speed reducer 7 mounted on the rack, a transmission system supported by the rack, a pumping rod hanging load, and a lubricating system. The working process is as follows: a motor drives the speed reducer 7 to rotate, a transmission wheel mounted on an output shaft of the speed reducer 7 drives the transmission system to move, and the control system controls the motor to rotate forwardly and reversely, so that a movement of the transmission system drives a pumping rod hanging load to move up and down to complete an oil recovery process, and the lubricating system provides automatic lubrication for the whole transmission system during an operation of the pumping unit.

Figure 1:
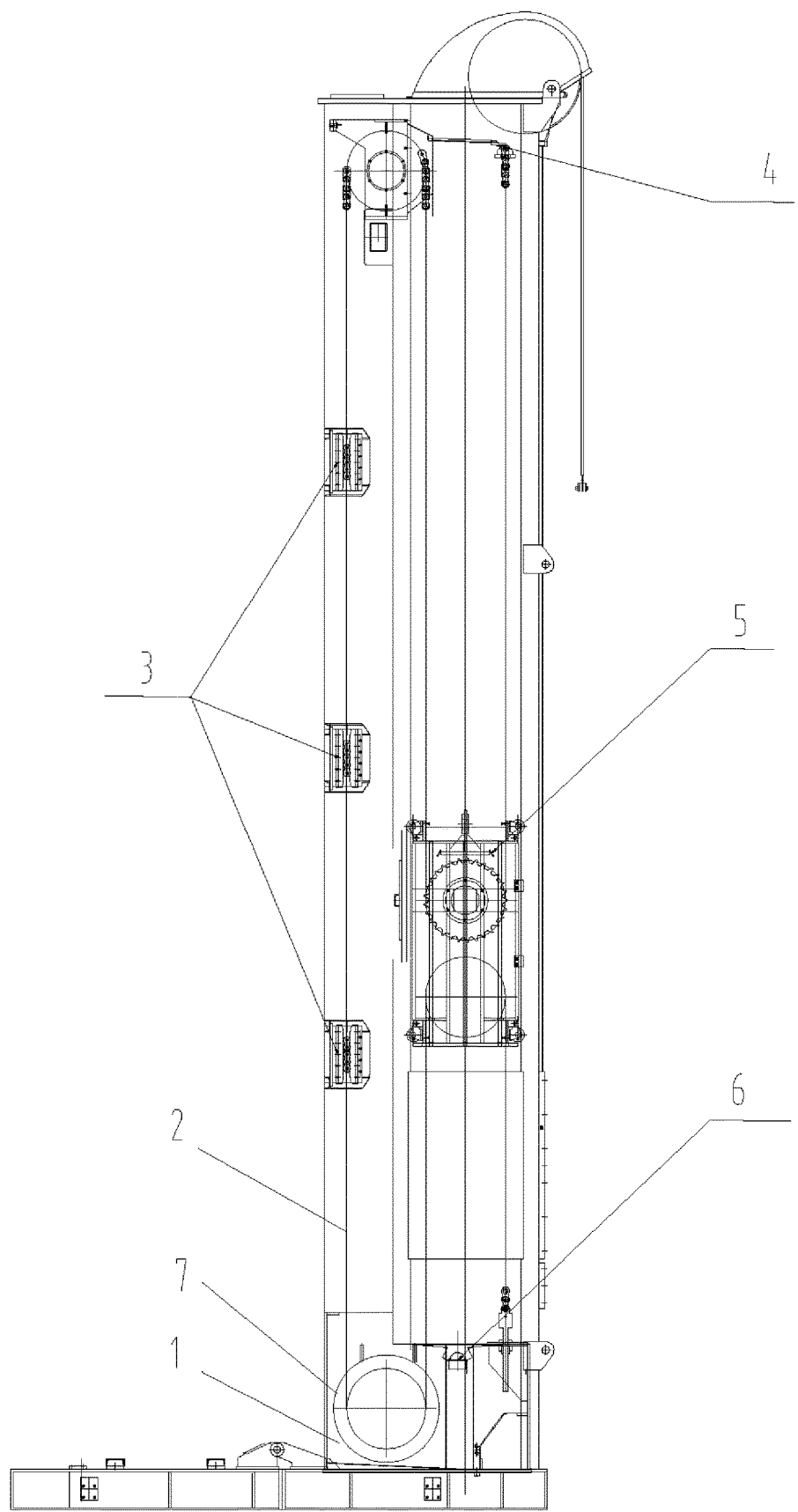
FIG. 1 illustrates a schematic view of a lubricating oil passage according to the disclosure.
Figure 2:
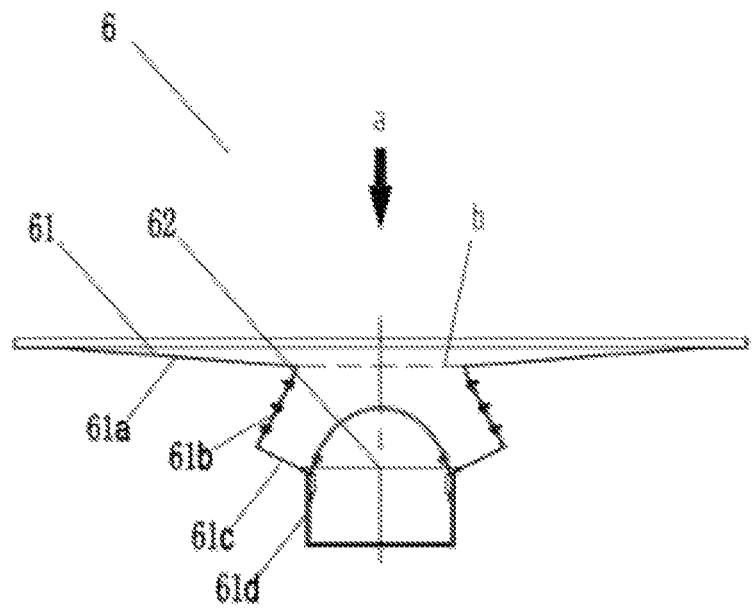
FIG. 2 illustrates a schematic structure view of an oil spill filter device.

As shown in FIG. 1 and FIG. 2, the lubricating system for a pumping unit includes: an oil pool 1. The oil pool 1 is located on a base at a bottom of a rack, and is a pool space with a certain amount of lubricating oil. A transmission wheel of a transmission system is impregnated in the oil pool 1. The lubricating system further includes a roller lubrication device 3 disposed on the rack and contacted with a transmission conveying device 2, a splash collection system at a top and inside of the rack, and an oil spill filter device 6 disposed above the oil pool 1. In the present embodiment, the transmission wheel is a sprocket, and the transmission conveying device 2 is a chain.

The roller lubrication device 3 includes three or more roller lubrication parts disposed in sequence, which can provide reliable lubrication to the entire chain, and a plurality of roller lubrication parts can also play a guiding role, can stabilize the entire long chain, and can assist in achieving the effect of smooth movement of the transmission conveying device.

The splash collection system includes a guiding plate for the top of the rack 4 and a guiding plate for a top of the balancing device 5. The splash collection system guides splashing oil, flushing stains and dust during the movement of the transmission system of the pumping unit to the oil spill filter device 6 above the oil pool. Due to a larger acceleration and centrifugal force of a rotating part of the sprocket, lubricating oil is easily splashed out of the sprocket and the chain, and a splash collection part is provided at the rotating position of the sprocket to maximize the collection of the splashing oil during the operation of an apparatus.

The oil spill filter device 6 collects the splashing oil of the transmission system, and the splashing oil is precipitated by a first cleaning device and filtered by a second cleaning device. In the present embodiment, the first cleaning device is a precipitation box 62, the second cleaning device is a filter screen 63, the splashing oil is cleaned twice and then flows back into the oil pool 1 to form cleaning for the lubricating oil, and the cleaned lubricating oil is recycled.

Figure 3:
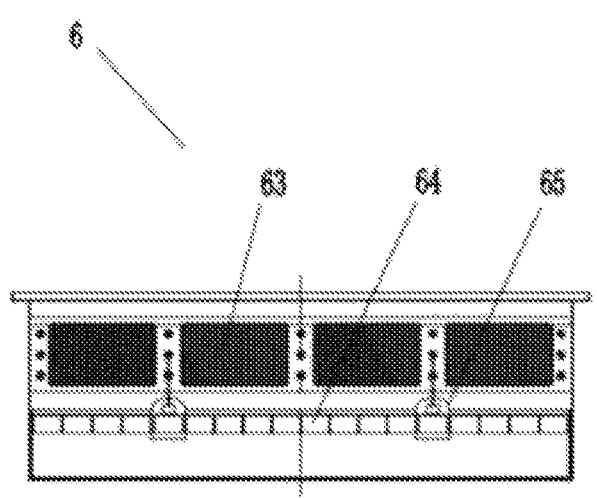
FIG. 3 illustrates a longitudinal cross-sectional view along a symmetrical center line of FIG. 2.

As shown in FIG. 2 and FIG. 3, the oil spill filter device 6 further includes a housing 61. The precipitation box 62 is disposed at a bottom of the housing 61 detachably. The precipitation box 62 includes a box body, magnets 64 for attracting impurities, and two hook-type lifting devices 65. The magnets 64 are arranged in two rows and disposed on the left side wall and right side wall of the precipitation box respectively, each row is provided with a plurality of magnets 64. The magnets 64 have a large attraction force, and can attract impurities such as iron filings in the splashing oil around the magnets 64 of the precipitation box to a large extent. The lifting devices 65 are used to lift the precipitation box 62, so that the precipitation box 62 is detachably taken out, and the impurities in the precipitation box 62 can be removed more conveniently.

The housing 61 of the oil spill filter device 6 includes a first section 61a, a second section 61b, a third section 61c and a fourth section 61d arranged sequentially from top to bottom. The first section 61a is a section that tapers from top to bottom, has an inclined surface with a large area and an acute angle with a horizontal direction, and is mainly used for collecting the splashing return oil. The second section 61b is a side wall section of the housing 61 flared from top to bottom, used for fixing the filter screen 63. The design of the second section 61b ensures that the splashing oil does not touch the filter screen 63 fixed on the second section 61b first when the splashing oil falls, which reduces the clogging of the filter screen 63 and ensures the cleanliness of the filter screen. Both sides of the second section 61b are fixed with four rectangular filter screens respectively. In an exemplary embodiment, the filter screen is a 120-mesh copper filter screen, which fully filters impurities in the lubricating oil to ensure the cleanliness of return oil. The material copper of the filter screen 63 is not easy to rust, thereby further avoiding the clogging of the filter screen 63, and achieving a better filtering effect. The fourth section 61d is a section carrying the precipitation box 62, and the third section 61c is a transition portion of the second section 61b and the fourth section 61d. The design of the third section 61c serves to further guide the splashing oil inside the oil spill filter device 6, which allows the splashing oil to flow smoothly into the precipitation box 62.

The working process of the lubricating system for a pumping unit of the disclosure is as follows: a lower portion of the sprocket and a part of the chain meshed therewith are impregnated in the oil pool 1; when the sprocket rotates, the chain impregnated with lubricating oil is driven out of the oil pool 1; when the sprocket located in the oil pool 1 rotates clockwise, the chain impregnated with oil from the bottom oil pool 1 moves upward from a left side of the sprocket and reaches the roller lubrication device 3. Due to the inherent viscosity of the lubricating oil, the lubricating oil will adhere to the roller lubrication device 3. When the sprocket located in the oil pool rotates for the same distance counterclockwise, the lubricating oil on the roller lubrication device 3 is applied to the chain of which an upper portion is not impregnated with the lubricating oil. At this time, a plurality of roller lubrication parts of the roller lubrication device 3 apply the lubricating oil to different sections of the chain, thus re-circulating to complete the self-lubrication of the entire transmission system.

When the lubricating oil adheres to the chain and runs along with the chain, splashing occurs, especially at the turn of the chain, there is a large splash, and impurities generated by chain wear are mixed. The guiding plate for a top of the rack 4 and the guiding plate for a top of the balancing device 5 collect and guide the splashing lubricating oil, and gather the lubricating oil into the oil spill filter device 6 in accordance with a splash return oil direction as shown in FIG. 2. The splashing oil containing impurities is first gathered from a periphery toward a middle along the first section 61a, falls downward from an intersection of the first section 61a and the second section 61b, and then enters the precipitation box 62 of the oil spill filter device 6 for precipitation. During this process, the splashing oil containing impurities does not flow through the second section 61b, which reduces the clogging of the filter screen 63 on the second section 61b, and ensures the cleanliness of the filter screen 63. The design of the third section 61c serves to further guide the splashing oil inside the oil spill filter device, which allows the splashing oil to flow smoothly into the precipitation box. The magnets in the precipitation box 62 located in the fourth section 61d can attract iron impurities in the lubricating oil, and other solid impurities are precipitated to the bottom of the precipitation box 62. The lubricating oil gradually accumulates in the precipitation box. When an oil level exceeds a set liquid level, that is, is higher than a position of a bottom of the filter screen 63, the lubricating oil subjected to first cleaning (precipitation) is subjected to second cleaning (filtration) through the filter screen 63. The filter screen can clean a floating floater with smaller particles, and the cleaned lubricating oil is returned to the oil pool 1. As filter stains block the filter screen 63, the oil level will gradually rise. When the oil level rises to an oil spill filter level b above the filter screen shown in FIG. 2, the filter screen 63 cannot filter the lubricating oil. It is necessary to lift the precipitation box 62 by the lifting devices 65, and clean the precipitation box 62 and the filter screen 63 in time. Otherwise, the function of filtering the lubricating oil will be disabled.

The above is only the preferred embodiments of the disclosure, not intended to limit the disclosure. As will occur to those skilled in the art, the disclosure is susceptible to various modifications and changes. Any modifications, equivalent replacements, improvements and the like made within the spirit and principle of the disclosure shall fall within the scope of protection of the disclosure.

What is claimed is:

1. A lubricating system for a pumping unit, the pumping unit comprising a rack, a balancing device, a transmission wheel, and a transmission conveying device cooperated with the transmission wheel, the lubricating system comprising: an oil pool and a roller lubrication device, a bottom of the transmission wheel being impregnated in the oil pool, the roller lubrication device being in rolling contact with the transmission conveying device, wherein the lubricating system further comprises an oil return device disposed above the oil pool, wherein the oil return device is configured to collect splashing oil driven by the transmission conveying device, so as to clean the splashing oil and then allow the splashing oil to flow back into the oil pool;
    wherein the oil return device is an oil spill filter device, and the splashing oil flows back into the oil pool after exceeding a set liquid level;
    the lubricating system further comprise a splash collection system, the splash collection system being disposed on an upstream of an oil passage of the oil spill filter device and configured to guide the splashing oil to the oil spill filter device;
    the splash collection system is a guiding device for guiding the splashing oil to the oil spill filter device;
    the guiding device is a guiding plate for a top of the rack and/or a guiding plate for a top of the balance device.

2. The lubricating system as claimed in claim 1, wherein the oil spill filter device allows the splashing oil to flow back into the oil pool after a first cleaning manner and a second cleaning manner.

3. The lubricating system as claimed in claim 2, wherein the first cleaning manner is a precipitation manner, and the second cleaning manner is a filtration manner.

4. The lubricating system as claimed in claim 2, wherein the oil spill filter device comprises a first cleaning device and a second cleaning device, the second cleaning device being disposed above the first cleaning device.

5. The lubricating system as claimed in claim 4, wherein the first cleaning device is a precipitation box.

6. The lubricating system as claimed in claim 4, wherein the second cleaning device is a filter screen.

7. The lubricating system as claimed in claim 5, wherein the oil spill filter device further comprises a housing, the precipitation box being disposed at a bottom of the housing detachably.

8. The lubricating system as claimed in claim 5, wherein the precipitation box comprises a box body, a magnet for attracting impurities, and a lifting device disposed at a top of the box body.

9. The lubricating system as claimed in claim 7, wherein the second cleaning device is a filter screen, the filter screen being disposed on a side wall section of the housing, the side wall section of the housing being a bell mouth flared from top to bottom.

10. The lubricating system as claimed in claim 9, wherein the housing comprises a first section and a second section arranged sequentially from top to bottom, the first section being a section that constricts gradually from top to bottom, the second section being a flared side wall section, and the flared side wall section being a bell mouth.

11. The lubricating system as claimed in claim 10, wherein the housing further comprises a third section and a fourth section, the fourth section being a section carrying the precipitation box, and the third section being a transition portion of the second section and the fourth section.

12. The lubricating system as claimed in claim 6, wherein the filter screen is a copper filter screen.

13. The lubricating system as claimed in claim 1, wherein the roller lubrication device comprises a plurality of roller lubrication components disposed sequentially.

14. A pumping unit, comprising the rack, a drive system for supplying power to the pumping unit, a control system for controlling the drive system, a speed reducer mounted on the rack, a transmission system fixed on the rack, and a pumping rod hanging load, wherein the pumping unit further comprises the lubricating system as claimed in claim 1.

15. A pumping unit, comprising the rack, a drive system for supplying power to the pumping unit, a control system for controlling the drive system, a speed reducer mounted on the rack, a transmission system fixed on the rack, and a pumping rod hanging load, wherein the pumping unit further comprises the lubricating system as claimed in claim 2.

* * * * *